No. 735,331. PATENTED AUG. 4, 1903.
C. ADAMS.
GRILLING OR TOASTING STOVE.
APPLICATION FILED DEC. 15, 1902.
NO MODEL.

Witnesses:
James P Mansfield
C Edw Duffey

Inventor:
Charles Adams
By
Alexander & Dowell
Attorneys

No. 735,331.

Patented August 4, 1903.

UNITED STATES PATENT OFFICE.

CHARLES ADAMS, OF KALGOORLIE, WESTERN AUSTRALIA, AUSTRALIA.

GRILLING OR TOASTING STOVE.

SPECIFICATION forming part of Letters Patent No. 735,331, dated August 4, 1903.

Application filed December 15, 1902. Serial No. 135,304. (No model.)

*To all whom it may concern:*

Be it known that I, CHARLES ADAMS, a subject of the King of Great Britain and Ireland, residing at the Adeline Mill, Kalgoorlie, in the Electorate of Yilgarn, State of Western Australia, and Commonwealth of Australia, have invented certain new and useful Improvements in Grilling or Toasting Stoves, of which the following is a specification.
The object of my invention is to provide a stove in which articles of uniform thickness, or nearly so—such as chops, steaks, or slices of bread—can be cooked. In the past various devices have been used to this end; but with my invention a charcoal or other fuel stove is produced in which both sides of the article are exposed to a regulated heat at the same time. Add to which the apparatus is light, portable, and underangeable and possesses means whereby the draft in the fire-boxes may be regulated and screens or hot plates be interposed between the said fire-boxes and the article to be cooked.

Figure 1:
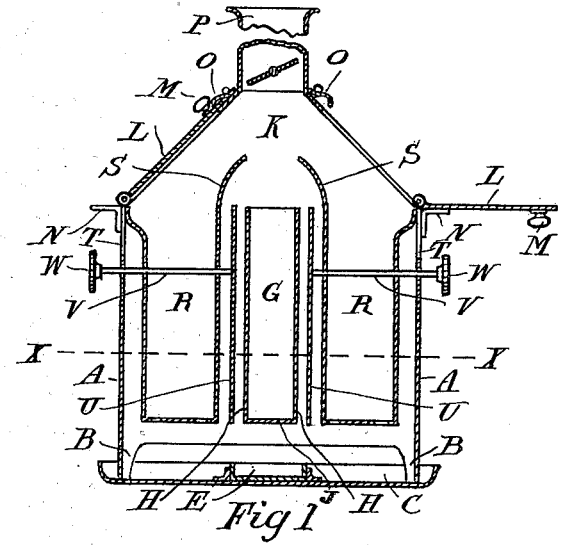
Figure 2:
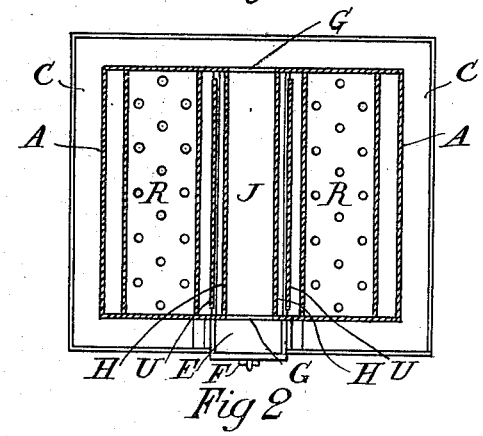
Figure 3:
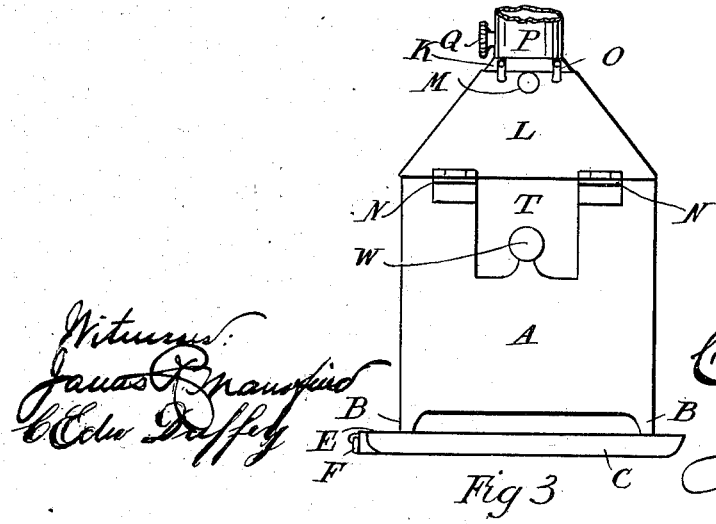

Referring to the drawings which form a part of this specification, Figure 1 represents a sectional end elevation of my stove. One of the fire-doors is open and the fire-boxes are secured to the casing. Fig. 2 is a plan below line X X, Fig. 1. Fig. 3 is a side elevation of the stove with the door closed.

Similar letters of reference indicate similar or corresponding parts where they occur in the several views.

On reference to the drawings it will be seen that my invention includes a casing or shell A, which is square or rectangular in section. On the bottom of this casing and at each corner of the same is a leg B. Beneath these said legs is an ash-tray C. This is preferably secured to the said legs and has upturned edges or lips, portion of one of which is cut away to accommodate the dripping-pan E. This dripping-pan rests upon the ash-tray, and the length of the said pan as also its width and the height of the edges or sides surrounding it will vary with conditions. At one end of the said pan is situated a pull-ring F.

Through each end of the casing is a hole or passage-way G, in which the article to be cooked is placed. This has plates or lining-walls H extending from one end of the casing to the other. It has also a bottom J. The said plates H and bottom J may be perforated, or instead of plates being used a grating of any character may be employed.

Above the casing is the uptake K. The ends of this are stationary, but the sides thereof form fire-doors L, the lower edges of which are hinged to the casing A. Attached to the exterior and near the fire-door is a handle M. Protruding outwardly from the top of each side of the casing is a lip or protuberance N, on which the fire-door rests when open. At the upper edge of each fire-door and secured to the uptake are one or more spring or other catches O to keep said door closed.

Attached to the top of the uptake is the bottom of a funnel P. Inside this is situated any suitable form of draft-regulator or damper, the handle Q on the spindle of which is of easy access. The length of this funnel, as also its diameter, will depend upon the purposes to which the stove is applied.

Inside each side of the casing and between the said side and the passage-way is situated an open-top fire-box R. The side walls of this fire-box in the example shown extend from one end of the casing to the other, and their ends may be secured to the ends of the casing. The height of the said fire-boxes, as also their width, will vary with the fuel used and the size of the stove and the area of the passage-way. The said boxes can either be of sheet metal and have suitable perforations therein or be made of a wire or meshed grating, or portion of them may be of unperforated plate and portion of gratings or perforated plates. Each inner wall of each of the two fire-boxes has upward extensions S.

Through each side of the casing A may be situated an observation or other hole T. The area of this, as also its position, will vary. Instead of their being one observation-hole in each side there may be more than one.

Situated between the inner walls of the fire-boxes and the passage-way may be placed perforated or unperforated hot plates or screens U. Each of these is capable of sliding to or from the article to be cooked by means of a rod V, upon which it hangs and which can pass through the fire-box. The inner end of the said rod is attached to the said hot plate and the outer end, which can pass through a hole in an extension of the casing at the hole T, protudes beyond the side of the casing. On its outer end is a knob W.

To use my stove, the fire-doors are first opened and rested upon the lips N on the casing, and if the fire-boxes are secured to the casing live fuel is directed into each fire-box. In so doing the extensions S prevent ashes or fuel falling onto or into the passage-way or into the dripping-pan. The damper is then opened and the fire-doors closed by lifting them upwardly and pressing them against the catches O. Air passes up through the bottom of the casing between the legs and the hot plates, (if such be used,) and the lining-walls of the passage-way soon become hot. The chop or steak is then either hung to the top of the passage-way G or preferably locked between a double-backed gridiron, which is inserted in the said passage-way. If the fire-boxes are detachable, they are filled before entering the casing. The gravy (if meat is being cooked) falls into the dripping-pan, which is so arranged as to escape the ashes. If toast is being prepared, it may simply be allowed to rest upon the bottom wall of the said passage-way and can be removed from either end when browned. My stove is either lifted by the knobs W or by convenient handles situated either on the sides or ends of the casing.

Having now described my invention, what I claim as new, and desire to secure by Letters Patent, is—

1. In an improved grilling or toasting stove, the combination of a casing having therethrough a passage-way, open-top fire-boxes on each side of said passage-way, an uptake above said fire-boxes, fire-doors on said uptake and a funnel above said uptake having a damper therein all substantially as and for the purpose described.

2. In a grilling and toasting stove, the combination with an outer casing, of an ash-tray beneath the same, a dripping-pan above said ash-tray, a passage-way through said casing, lining-walls around said passage-way, an open-top fire-box on each side of said passage-way having an upward extension on the inner wall, a hot plate between each fire-box and the passage-way capable of being moved to or from the fire-box, an uptake above said fire-boxes having fire-doors therein, a funnel having a damper therein, all arranged and adapted to operate substantially as described.

3. In a grilling or toasting stove, the combination of a casing having a passage or chamber, a fire-box on each side of said passage, and adjustable hot plates between the inner sides of said fire-boxes and said passage, substantially as described.

4. In a grilling or toasting stove, the combination of a casing, adjacent parallel fire-boxes therein open at their upper ends, a common uptake above the fire-boxes, fire-doors in said uptake above said boxes, a passage or chamber between the adjacent sides of the boxes and a drip-pan at the bottom of said passage, substantially as described.

In witness whereof I have hereunto set my hand to this specification in the presence of two witnesses.

CHARLES ADAMS.

Witnesses:
ROBERT WILLIAM HALL,
CECIL VALENTINE ADDISON.